United States Patent
Liu (10) Patent No.: US 12,198,262 B2
(45) Date of Patent: Jan. 14, 2025

(54) IMAGE PROCESSING METHOD AND APPARATUS, ELECTRONIC DEVICE, AND COMPUTER-READABLE MEDIUM FOR UPDATING A DISTANT VIEW PORTION WITHIN A VIRTUAL ENVIRONMENT

(71) Applicant: TENCENT TECHNOLOGY (SHENZHEN) COMPANY LIMITED, Guangdong (CN)

(72) Inventor: Yi Liu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 312 days.

(21) Appl. No.: 17/892,271

(22) Filed: Aug. 22, 2022

(65) Prior Publication Data

US 2022/0392153 A1 Dec. 8, 2022

Related U.S. Application Data (63) Continuation of application No. PCT/CN2021/101762, filed on Jun. 23, 2021.

(30) Foreign Application Priority Data

Jul. 21, 2020 (CN) .......................... 202010704676.4

(51) Int. Cl.
*G06T 15/20* (2011.01)
*G06T 17/00* (2006.01)

(52) U.S. Cl.
CPC ............ *G06T 15/205* (2013.01); *G06T 17/00* (2013.01); *G06T 2200/08* (2013.01); *G06T 2200/24* (2013.01); *G06T 2210/21* (2013.01)

(58) Field of Classification Search
CPC ... G06T 15/205; G06T 17/00; G06T 2200/08; G06T 2200/24; G06T 2210/21
See application file for complete search history.

(56) References Cited

U.S. PATENT DOCUMENTS

| 2003/0058238 A1* | 3/2003 | Doak ...................... A63F 13/45 |
| | | 709/217 |
| 2010/0097375 A1* | 4/2010 | Tadaishi .................. A63F 13/63 |
| | | 345/420 |

(Continued)

FOREIGN PATENT DOCUMENTS

| CN | 1904974 A | 1/2007 |
| CN | 102722901 A | * 10/2012 |

(Continued)

OTHER PUBLICATIONS

International Search Report for PCT/CN2021/101762 dated Sep. 24, 2021.

(Continued)

*Primary Examiner* — Terrell M Robinson
(74) *Attorney, Agent, or Firm* — Sughrue Mion, PLLC (57) ABSTRACT

An image processing method and apparatus, an electronic device, and a computer-readable storage medium. The method includes: displaying, in a user interface, a picture obtained by observing a virtual environment from a virtual camera, the picture including a distant view portion corresponding to a virtual area of the virtual environment, the virtual area being outside a preset range associated with the virtual camera; detecting an editing operation performed on a virtual model in the virtual area; and updating, in response to determining the edited virtual model meets a specific condition, the distant view portion based on the edited virtual model.

20 Claims, 7 Drawing Sheets

(56) References Cited

U.S. PATENT DOCUMENTS

| | | | | |
|---|---|---|---|---|
| 2012/0142422 A1* | 6/2012 | Mori | ............... | A63F 13/12 |
| | | | | 463/42 |
| 2016/0250554 A1* | 9/2016 | Haigh-Hutchinson | ............ | |
| | | | | A63F 13/837 |
| | | | | 463/32 |
| 2019/0083885 A1* | 3/2019 | Yee | ............... | G06T 15/20 |

FOREIGN PATENT DOCUMENTS

| | | |
|---|---|---|
| CN | 108510597 A | 9/2018 |
| CN | 108650442 A | 10/2018 |
| CN | 111803944 A | 10/2020 |
| JP | 2005-275759 A | 10/2005 |
| JP | 2010-055638 A | 3/2010 |

OTHER PUBLICATIONS

Written Opinion for PCT/CN2021/101762 dated Sep. 24, 2021.
Chinese Office Action for Chinese Application No. 202010704676.4 dated Jun. 22, 2021.

\* cited by examiner

IMAGE PROCESSING METHOD AND APPARATUS, ELECTRONIC DEVICE, AND COMPUTER-READABLE MEDIUM FOR UPDATING A DISTANT VIEW PORTION WITHIN A VIRTUAL ENVIRONMENT

CROSS-REFERENCE TO RELATED APPLICATION(S)

This application is a continuation application of International application No. PCT/CN2021/101762, filed on Jun. 23, 2021, which claims priority to Chinese Patent Application No. 202010704676.4 filed with the China National Intellectual Property Administration on Jul. 21, 2020, the disclosures of which are incorporated by reference in their entireties.

FIELD

The present disclosure relates to the multimedia information generation technologies, and in particular, to an image processing method and apparatus, an electronic device, and a computer-readable storage medium.

BACKGROUND

The display technology based on graphics processing hardware expands the channel for environment perception and information obtaining. Specifically, the display technology for a virtual environment can achieve diversified interactions between virtual objects controlled by the user or artificial intelligence according to actual application requirements, and is applicable to various typical application scenes, for example, a military exercise simulation, a game, and other virtual scenes, and the like, which can simulate the real battle process between the virtual objects.

In the related art, the user has increasingly high requirements for the virtual scene and hopes to have an immersive experience in the virtual scene, and a distant view portion in the virtual environment can be adjusted according to the related art, to achieve the immersive experience. However, the adjustment consumes a lot of manual drawing costs, and additionally consumes graphics computing resources of the computer device.

SUMMARY

The present disclosure provides an image processing method and apparatus, an electronic device, and a computer-readable storage medium, to adjust a distant view portion in a virtual environment in an effective and low resource consumption manner.

The technical solutions in the embodiments of the disclosure are implemented as follows:

An embodiment of the disclosure may provide an image processing method, the method including: displaying, in a user interface, a picture obtained by observing a virtual environment from a virtual camera, the picture comprising a distance view portion corresponding to a virtual area of the virtual environment, the virtual area being outside a present range associated with the virtual camera; detecting an editing operation performed on a virtual model in the virtual area; and updating, in response to determining the edited virtual model meets a specified condition, the distant view portion based on the edited virtual model.

An embodiment of the disclosure may provide an image processing apparatus, the apparatus including: an information transmission module, configured to display a user interface, and display, in the user interface, a picture obtained by observing a virtual environment from a virtual camera, the picture including a distant view portion corresponding to a virtual area of the virtual environment, the virtual area being outside a preset range associated with the virtual cameras; and an information processing module, configured to: detect an editing operation performed on a virtual model in the virtual area; and update, in response to determining the edited virtual model meets a predetermined condition, the distant view portion based on the edited virtual model.

An embodiment of the disclosure may provide an electronic device, including a memory, configured to store executable instructions; and a processor, configured to implement, when executing the executable instructions stored in the memory, the image processing method provided in the above embodiment.

An embodiment of the disclosure may further provide a computer-readable storage medium storing executable instructions, the executable instructions, when executed by a processor, causes the processor to implement the image processing method provided in the foregoing embodiments.

In the present disclosure, a picture obtained by observing a virtual environment from a virtual camera is displayed in a user interface, where the picture includes a distance view portion corresponding to a virtual area of the virtual environment, the virtual area being outside a present range associated with the virtual camera; an editing operation performed on a virtual model in the virtual area is detected; and in response to determining the edited virtual model meets a predetermined condition, the distant view portion is updated based on the edited virtual model. Therefore, a distant view portion in a virtual environment is adjusted in an effective and low resource consumption manner while performance overhead of a terminal is reduced, so that performance of the virtual environment is improved, thereby bring a better immersive experience to the user.

BRIEF DESCRIPTION OF THE DRAWINGS

To describe the technical solutions in the embodiments of the disclosure more clearly, the following briefly describes the accompanying drawings required for describing the embodiments. The accompanying drawings in the following description show merely some embodiments of the disclosure, and a person skilled in the art may still derive other drawings from these accompanying drawings without creative efforts. In addition, one of ordinary skill would understand that aspects of example embodiments may be combined together or implemented alone.

DESCRIPTION OF EMBODIMENTS

To make the objectives, technical solutions, and advantages of the disclosure clearer, the disclosure is further described in detail below with reference to the accompanying drawings. It is to be understood that the described embodiments are not to be considered as a limitation to the disclosure, and all other embodiments obtained by a person of ordinary skill in the art without creative efforts shall fall within the protection scope of the present disclosure.

The embodiments of the disclosure provide an image processing method and apparatus, an electronic device and a computer-readable storage medium in which a distant view portion in a virtual environment is adjusted in an effective and low resource consumption manner while performance overhead of a terminal is reduced, so that the performance of the virtual environment is improved, thereby bring a better immersive experience to the user.

In the following descriptions, the term "some embodiments" describes subsets of all possible embodiments. However, it may be understood that the "some embodiments" may be the same subset or different subsets of all the possible embodiments, and may be combined with each other without conflict.

A description is made on nouns and terms involved in the embodiments of the disclosure, and the following explanations are applicable to the nouns and terms involved in the embodiments of the disclosure.

1) The expression "in response to" is used for representing a condition or state on which one or more to-be-performed operations depend. In a case that the condition or state is met, the one or more operations may be performed immediately or have a set delay; and there is no limitation to the sequence of performing the operations unless explicitly stated.

2) Terminal: It includes but is not limited to a common terminal and a dedicated terminal, where the common terminal maintains a persistent connection and/or a short connection to a transmit channel, and the dedicated terminal maintains a persistent connection to the transmit channel.

3) Client: It is a carrier in the terminal that implements specific functions, for example, a mobile application (App) is a carrier in a mobile terminal that implements specific functions such as performing payment and consumption or purchasing a financial product.

4) Virtual environment: It is a virtual environment displayed (or provided) by an application when run on the terminal. The virtual environment may be a simulated environment of a real world, or may be a semi-simulated semi-fictional three-dimensional environment, or may be an entirely fictional three-dimensional environment. The virtual environment may be any one of a two-dimensional virtual environment, a 2.5-dimensional virtual environment, or a three-dimensional virtual environment. A description is made by using an example in which the virtual environment is a three-dimensional virtual environment in the following embodiments, but this is not limited. In some embodiments, the virtual environment may correspond to a game scene and may be used for a virtual environment battle between at least two virtual objects. In some embodiments, the virtual environment may be further used for a battle between at least two virtual objects by using virtual guns. In some embodiments, the virtual environment may be further used for a battle between at least two virtual objects by using virtual guns in a range of a target region, and the range of the target region may be continuously decreased as time goes by in the virtual environment.

5): Virtual prop: It is a virtual weapon that attacks by shooting bullets in the virtual environment or a virtual bow and arrow that shot an arrow cluster. The virtual object may pick up the virtual gun in the virtual environment, and attack by using the virtual gun obtained through picking-up. In some embodiments, each virtual gun may be provided with at least one slot for fitting at least one gun accessory. In some embodiments, the virtual object may be a player character controlled through an operation performed on a client, or may be an artificial intelligence (AI) character set in a virtual scene battle through training, or may be a non-player character (NPC) set in virtual scene interaction. In some embodiments, the virtual object may be a virtual object competing in the virtual scene. In some embodiments, a quantity of virtual objects participating in the interaction in the virtual scene may be preset, or may be dynamically determined according to a quantity of clients participating in the interaction.

For example, in a shooting game, the user may control the virtual object to descend freely, glide, parachute, or the like in the sky of the virtual scene, or run, jump, crawl, stoop to move forward, or the like on the land, or swim, float, dive, or the like in the ocean. Certainly, the user may alternatively control the virtual object to drive a virtual vehicle to move in the virtual scene, for example, the virtual vehicle may be a virtual car, a virtual aircraft, a virtual yacht, or the like. The foregoing scenes are merely used as an example for description, and this is not specifically limited in the embodiments of the disclosure. The user may further control the virtual object to perform interaction in a manner such as battling against another virtual object by using a virtual weapon. The virtual weapon may be a cold weapon, or may be a hot weapon, and the type of the virtual weapon is not specifically limited in the embodiments of the disclosure.

The method provided in the disclosure may be applied to a virtual reality application, a three-dimensional map program, a first-person shooting (FPS) game, a multiplayer online battle arena (MOBA) game, a massive multiplayer online role-playing game (MMORPG), and the like. An application during a game is used as an example for description in the following embodiments.

A game based on the virtual environment usually includes maps of one or more game worlds. The virtual environment in the game simulates scenes in the real world. The user may control a virtual object in the game to perform actions in the virtual environment such as walking, running, jumping, shooting, combatting, driving, switching to a virtual weapon, and using the virtual weapon to attack another virtual object, which has relatively high interactivity. In addition, a plurality of users may form a team online to perform an arena game. In a case that the user controls the virtual object to launch an attack against a target virtual object by using the virtual weapon, the user selects a suitable virtual weapon according to a position where the target virtual object is located or an operation habit, to attack the virtual object.

The foregoing embodiment mainly involves scenarios in which a plurality of virtual objects interact with each other in a game program. During actual implementation, this embodiment involves a scenario in the MMORPG in which virtual character objects controlled by a plurality of players adversarially interact with NPCs created in the game program. In the MMORPG, the player may control a virtual character object of the player to adversarially interact with virtual character objects controlled by other players or adversarially interact with the NPCs. Generally, such adversarial interaction is performed in a small scale, for example, at most 20 virtual character objects adversarially interact with each other in a game scene map, or at most 10 virtual character objects adversarially interact with at most 20 NPCs in a game scene map. In a special case, to improve playability of a game and attract more players to play the game, an operator of the game grogram may launch some activities that require a large quantity of virtual character objects to adversarially interact with a same NPC in a same game scene map at the same time, and such activities are large-scale adversarial interaction. In large-scale adversarial interaction, hundreds of virtual character objects need to challenge a powerful NPC at the same time, and such a powerful NPC may also be referred to as a BOSS, for example, a world BOSS, a lord BOSS, or an activity BOSS in the game.

Figure 1:
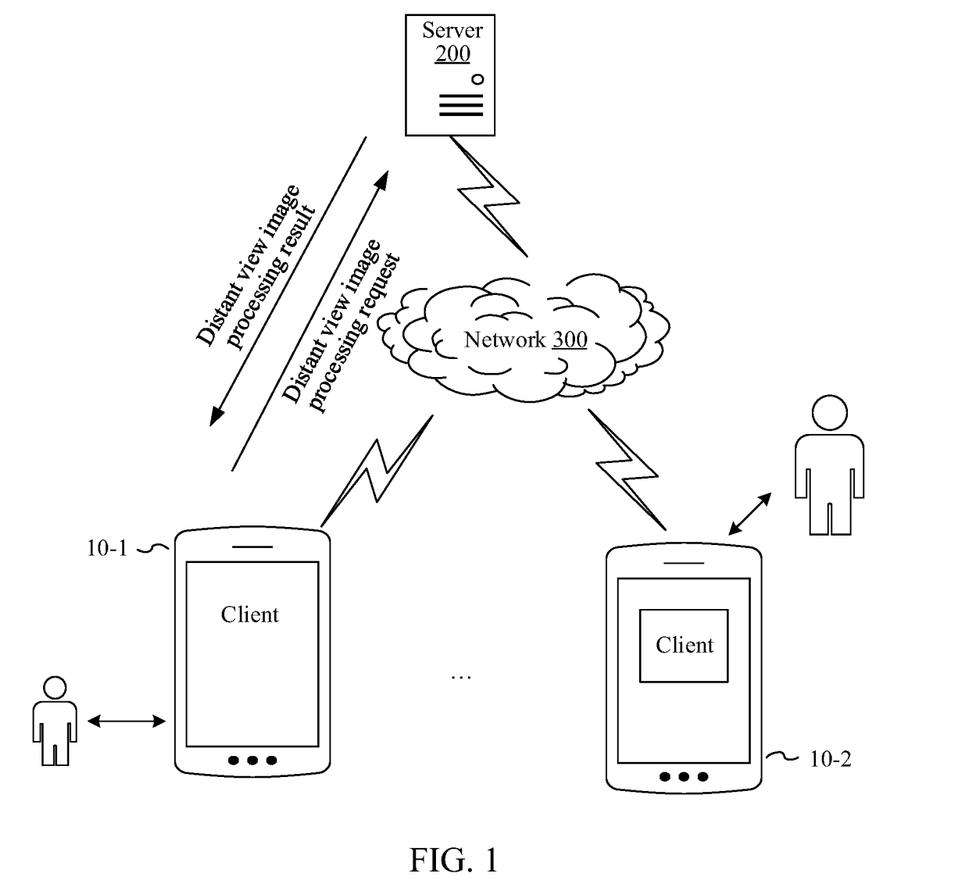
FIG. 1 is a schematic diagram of an application scenario of an image processing method according to an embodiment.

FIG. 1 is a schematic diagram of an application scenario of an image processing method according to an example embodiment of disclosure. Referring to FIG. 1, terminals (including a terminal 10-1 and a terminal 10-2) include clients capable of loading, running, and displaying software of different game scenes, for example, clients or plug-ins of different games. A user may observe a virtual environment from a picture of a virtual object through a corresponding client, and perform processing on a distant view portion in a user interface in a change process of a picture (for example, during a game, switching the distant view portion or updating an initial distant view portion in the picture, and performing interaction with a virtual model in the distant view portion). The terminals are connected to a server 200 through a network 300. The network 300 may be a wide area network, a local area network, or a combination of the wide area network and the local area network. Data transmission is implemented through a radio link.

For example, the server 200 is configured to deploy an image processing apparatus to implement the image processing method provided in this embodiment to display a user interface, where the user interface includes a picture obtained by observing a virtual environment from a virtual camera, the picture including different distant view portions corresponding to a virtual area in the virtual environment, the virtual area being outside a preset range associated with the virtual cameras; detect an editing operation performed on a virtual model in the virtual area; and update the distant view portion based on the edited virtual model.

The image processing apparatus provided in an embodiment of the disclosure is applicable to different game environments including but not limited to a virtual reality application, a three-dimensional map program, a military simulation program, an FPS game, a MOBA game, and the like. A distant view portion including different virtual models (for example, a distant view portion including virtual models such as virtual weapons, or a virtual bow and arrow that shot an arrow cluster) obtained by a user in a current display interface may also be called by other applications.

Figure 2:
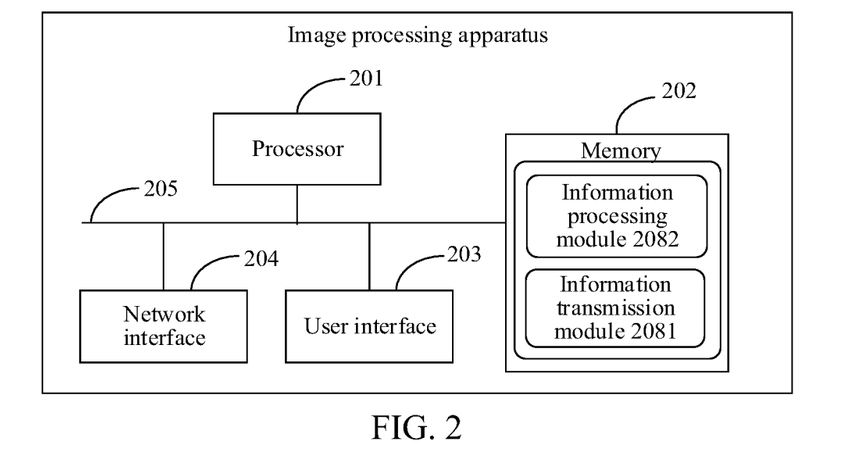
FIG. 2 is a schematic diagram of a composition structure of an image processing apparatus according to an embodiment.

The image processing apparatus may be implemented in various forms, for example, a dedicated terminal with a processing function of the image processing apparatus, or an electronic device (a mobile phone or a tablet computer) with the processing function of the image processing apparatus, for example, the terminal 10-1 or the terminal 10-2 shown in FIG. 1. FIG. 2 is a schematic diagram of a composition structure of an image processing apparatus according to an embodiment of the disclosure. It may be understood that FIG. 2 merely shows an example structure rather than all structures of the image processing apparatus. A part of the structure or the entire structure shown in FIG. 2 may be implemented as required.

The image processing apparatus provided in an example embodiment of the disclosure includes: at least one processor 201, a memory 202, a user interface 203, and at least one network interface 204. Various components in the image processing apparatus are coupled together through a bus system 205. It may be understood that the bus system 205 is configured to implement connection and communication between such components. In addition to a data bus, the bus system 205 further includes a power bus, a control bus, and a state signal bus. However, for ease of clear description, all types of buses are marked as the bus system 205 in FIG. 2.

The user interface 203 may include a display, a keyboard, a mouse, a track ball, a click wheel, a key, a button, a touch panel, a touchscreen, or the like.

It may be understood that the memory 202 may be a volatile memory or a non-volatile memory, or may include both a volatile memory and a non-volatile memory. The memory 202 in an example embodiment can store data to support operation of the terminal (e.g., 10-1). Examples of these types of data include any computer program to be operated on the terminal (e.g., 10-1), for example, an operating system and an application program. The operating system includes various system programs, such as framework layers, kernel library layers, and driver layers used for implementing various basic services and processing hardware-based tasks. The application program may include various application programs.

In some embodiments, the image processing apparatus provided may be implemented by a combination of software and hardware. For example, the image processing apparatus provided in an example embodiment may be a processor in the form of a hardware decoding processor, and is programmed to perform the image processing method provided in this embodiment of the disclosure. For example, the processor in the form of a hardware decoding processor may use one or more application-specific integrated circuits (ASICs), a digital signal processor (DSP), a programmable logic device (PLD), a complex programmable logic device (CPLD), a field programmable gate array (FPGA), or another electronic element.

The image processing apparatus provided in this embodiment may be directly embodied as a combination of software modules, or code, executed by the processor 201. The software module, or code, may be located in a storage medium, the storage medium is located in the memory 202, and the processor 201 reads executable instructions included in the software module in the memory 202, and implements, in combination with necessary hardware (for example, including a processor 201 and another component connected to the bus 205), the image processing method provided in this embodiment of the disclosure.

For example, the processor 201 may be an integrated circuit chip, and has a signal processing capability, for example, a general-purpose processor, a DSP, or another programmable logical device, a discrete gate or a transistor logical device, or a discrete hardware component. The general-purpose processor may be a microprocessor, any conventional processor, or the like.

In an example in which the image processing apparatus is implemented by hardware, the data processing apparatus may be directly executed by using the processor 201 in the form of a hardware decoding processor, for example, one or more ASICs, a DSP, a PLD, a CPLD, an FPGA, or another electronic element, to implement the image processing method provided in an embodiment of the disclosure.

The memory 202 in an embodiment of the disclosure is configured to store various types of data to support operations of the image processing apparatus. Examples of these types of data include any executable instruction to be operated on the image processing apparatus, for example, an executable instruction, and a program for implementing the image processing method in this embodiment may be included in the executable instruction.

In some other embodiments, the image processing apparatus may be implemented by software. FIG. 2 shows an image processing apparatus stored in the memory 202, which may be software in the form of a program and a plug-in and includes a series of modules or code. An example of a program stored in the memory 202 may include an image processing apparatus, and the image processing apparatus includes the following: an information transmission module 2081 and an information processing module 2082. In a case that the software modules in the image processing apparatus are read by the processor 201 into a RAM for execution, the image processing method provided in an embodiment of the disclosure is implemented. Functions of the code in the image processing apparatus are sequentially described in subsequent embodiments.

For ease of description, FIG. 2 shows all the modules at a time. However, the image processing apparatus should not be construed as excluding the implementation that only the information transmission module 2081 and the information processing module 2082 are included, and functions of the modules or code are described below.

The image processing method provided in an embodiment of the disclosure is described with reference to the image processing apparatus shown in FIG. 2. In the related art, distant-view processing in the game is mainly performed in the following two manners:

1) Imposter technology: Imposter technology is a technology that presents a complex model by using textures and can replace the complex model with an extremely simple model to significantly save performance. The implementation principle of the imposter technology is briefly described as follows: pictures of a model are taken at various angles through a camera, and then different pictures are selected according to the angle of player's camera for displaying. The pictures do not necessarily indicate a final rendering result, which are essentially data. Such a manner has the following defects: The imposter technology needs to bake the model from a plurality of angles in advance and is more suitable for a centrosymmetric model. However, for a model of another type, a quantity of pictures to be processed is greatly increased for smooth multi-angle conversion. As a result, game files take up a lot of storage space of the terminal.

2) Levels of Detail (LOD) technology: The LOD technology is to determine resource allocation of item rendering according to positions and importance of nodes of an item model in a display environment, and reduce the number of faces and levels of details of an item that is not important, thereby performing an efficient rendering operation. Such a manner has the following defects: Although the LOD technology can select, according to the distance, a model with a lowest level of details for display, each model is independently displayed. With an increase in a quantity of distant-view models, some models accounting for a relatively small portion in a distant view may also consume some overhead. Although such models can be excluded through a culling algorithm in advance, culling a large number of models also consumes a lot of overhead, occupying the computing performance of the terminal and affecting the user experience.

Figure 3:
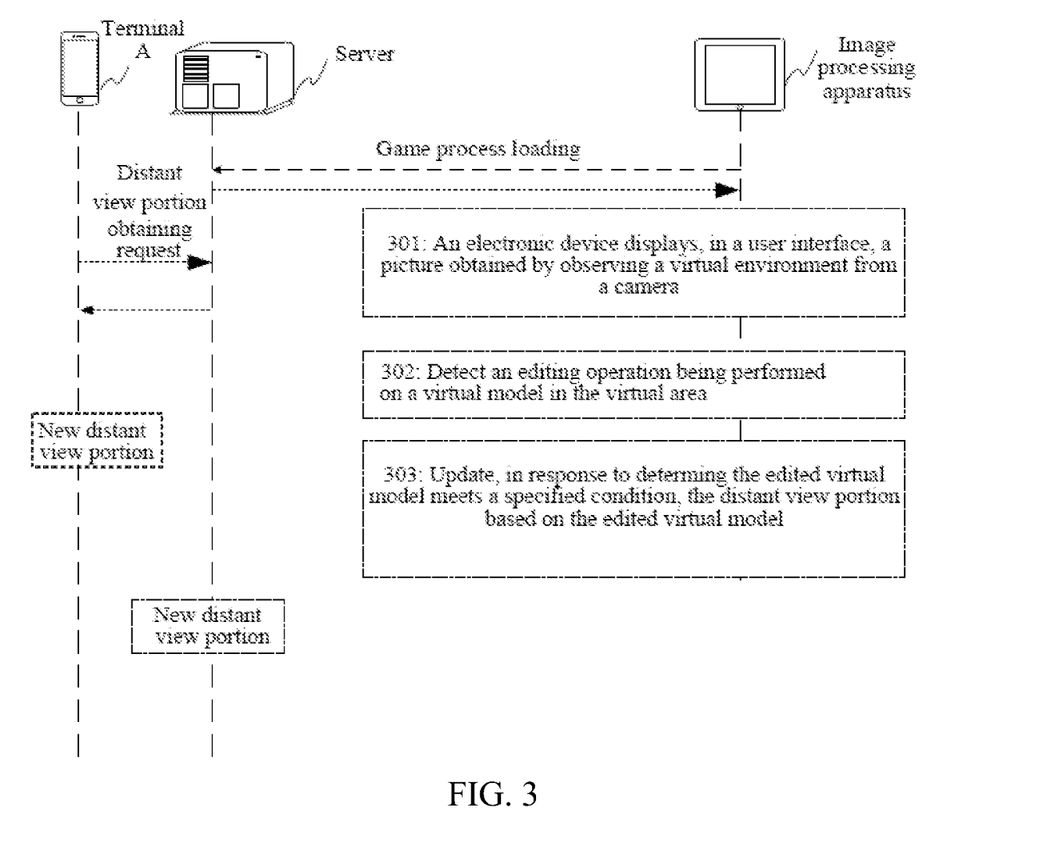
FIG. 3 is a schematic flowchart of an image processing method according to an embodiment.

To overcome the foregoing defects, referring to FIG. 3, FIG. 3 is a schematic flowchart of an image processing method according to an embodiment of the disclosure. It may be understood that operations shown in FIG. 3 may be performed by various electronic devices running the image processing apparatus, for example, various game devices including the image processing apparatuses, where a dedicated terminal including the image processing apparatus may be encapsulated in the terminal 10-1 shown in FIG. 1 to execute corresponding code in the image processing apparatus shown in FIG. 2. The following describes the operations shown in FIG. 3.

Operation 301: An electronic device displays, in a user interface, a picture obtained by observing a virtual environment from a virtual camera.

Figure 4:
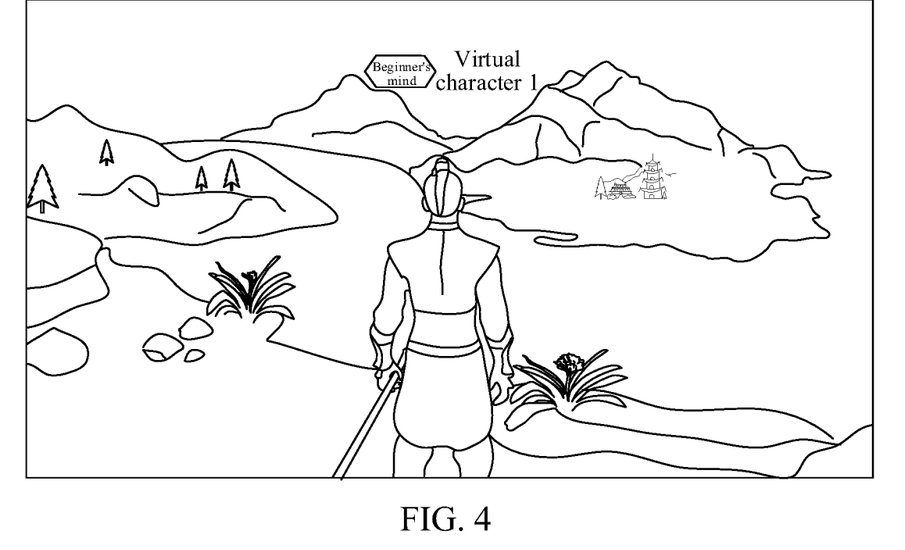
FIG. 4 is a schematic diagram of front-end display of an image processing method according to an embodiment.

The picture includes different distant view portions corresponding to a virtual area of the virtual environment, the virtual area being outside a preset range associated with the virtual camera. FIG. 4 is a schematic diagram of front-end display of an image processing method according to an embodiment of the disclosure. Referring to FIG. 4, the image processing method provided in an example embodiment is applicable to a role-playing game. In a game scene of a battle, the user may control a virtual object to kill an enemy virtual object by using different skills in a game scene provided by a game battle to achieve a victory of the game battle. In such a process, the virtual object in the game can move in a map according to different control instructions. For example, the map is embodied in the form of a three-dimensional space, and the user may control a game character (that is, the virtual object) to freely move in upper, lower, left, right, front, and rear axes. In addition, a user interface of an action game changes in real time. Although there are a plurality of buttons in the user interface of the action game, such buttons are usually configured in a fixed region.

Operation 302: Detect an editing operation performed on a virtual model in the virtual area.

During actual implementation the electronic device determines a trigger state of the distant-view editing operation and determines whether the distant-view editing operation is triggered based on the trigger state of the distant-view editing process.

In some embodiments, the electronic device loads placement data of the virtual area and determines the editing process of the virtual model according to the loaded placement data.

The placement data of the virtual model includes two parts: collision data that is used for representing the movement state of the virtual camera in a case that the virtual model is in a movement state relative to a placed virtual model; and display data matching the collision data, where the display data can accurately present a movement process of the virtual camera in the user interface.

In some embodiments, the electronic device may determine the collision data of the virtual camera by performing the following operations: detecting a position adjustment operation or an orientation moving operation for the virtual camera in a case that it is determined that the distant-view editing operation is performed; determining placement data of the virtual model based on the detected position adjustment operation or orientation moving operation; and separating the placement data of the virtual model to obtain the collision data of the virtual camera and display data matching the collision data. Therefore, in a case that a game is loaded into a scene, whether a distant-view editing function is enabled is determined. If the function is not enabled, it means that a distant view in a current game process may not change. In this case, only a low-poly fake scene needs to be loaded. In a case that the distant-view editing function is enabled, corresponding collision data is first generated according to editing data, and then the collision data and display data are split, so that the collision data may not be affected no matter how the virtual model is updated, thereby ensuring accuracy of a scene logic. In some embodiments, a normal model of an item is loaded in a case that the collision data is currently within a detail range; or otherwise low-poly models corresponding to the virtual models are loaded from high to low according to weights of the virtual models, and then such models are combined to obtain a unique distant-view model.

The position adjustment operation for the virtual camera is performed to adjust a position of the virtual camera, and the orientation moving operation for the virtual camera is performed to change an orientation of the virtual camera.

Operation 303: Update, in response to the edited virtual model meets a specified condition, the distant view portion based on the edited virtual model.

In some embodiments, weight parameters of a low-poly model matching the game scene and different virtual models in the distant view portion may further be configured before a game process is loaded; the low-poly model matching the game scene is replaced with a virtual model in the distant view portion in a case that it is determined that the distant-view editing operation is not triggered. In the image processing method, in addition to the normal model of the item itself, a low-poly model for the distant view portion further needs to be separately configured. Such a low-poly model is saved in a configuration file of the game process in the form of an independent file and is configured to represent different virtual items in the user interface. In this way, there is no need to load two models to switch between the virtual model and the distant view portion, thereby resolving memory overhead caused by the conventional LOD technology, and reducing hardware load of a game terminal.

In some embodiments, in addition to an ultra-low poly, a corresponding weight further needs to be configured, and the weight may be defined as importance of the model. Through the configuration, on the one hand, the computing overhead is saved; and on the other hand, manual control is convenient to be performed to obtain a desirable distant view. Therefore, some slender models are prevented from being cropped in the distant view.

A threshold also needs to be defined in such a configuration process, establishing a specified condition. After the distant view changes, in a case that an accumulative changing weight is less than the threshold, such a case is caused by changes of some small items and there is no need to refresh the distant view portion; and in a case that the accumulative changing weight is greater than the threshold, such a case is caused by changes of a larger or more important item and it is necessary to refresh the distant view portion.

In some embodiments, the merging low-poly models corresponding to different virtual models in the distant view portion in a case that the collision data is out of a corresponding detail range to obtain a new distant view image may be implemented by performing the following operations: determining different virtual models in the distant view portion that need to be adjusted; in a case that the collision data is out of the corresponding detail range, determining weight parameters of different virtual models in the distant view portion, and sorting the weight parameters of different virtual models in the distant view portion; and sequentially combining low-poly models corresponding to virtual models according to a sorting result to obtain the new distant view portion.

Figure 5:
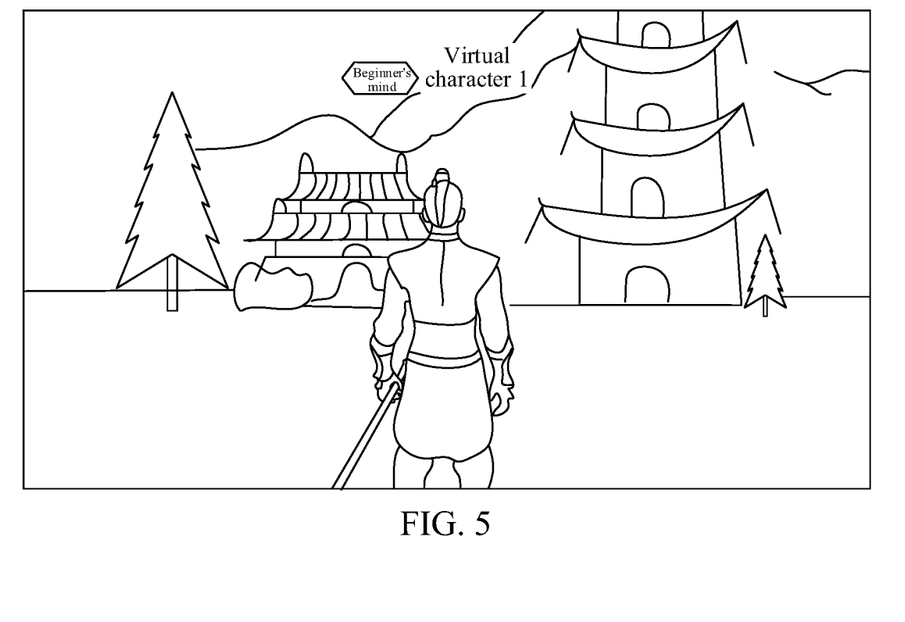
FIG. 5 is a schematic diagram of front-end display of an image processing method according to an embodiment.
Figure 6:
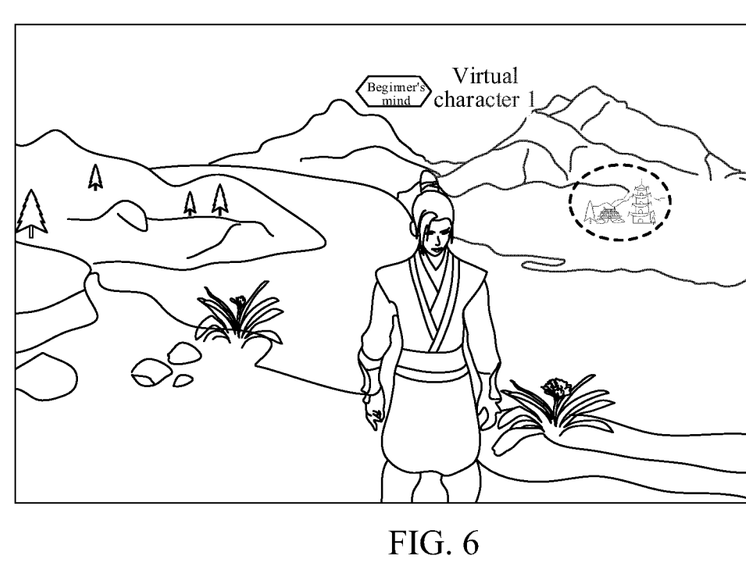
FIG. 6 is a schematic diagram of front-end display of an image processing method according to an embodiment.

FIG. 5 is a schematic diagram of front-end display of an image processing method according to an embodiment of the disclosure and FIG. 6 is a schematic diagram of front-end display of an image processing method according to an embodiment of the disclosure. In the game process, with the movement of the virtual camera, when a close-up view image shown in FIG. 5 is adjusted to a distant view portion corresponding to the virtual area shown in FIG. 6, different virtual models (two buildings shown in the figure) in the distant view portion have different weight parameters, and low-poly models corresponding to the virtual models in the distant view portions are sequentially combined according to the weight parameters, to obtain a virtual model of a new distant view portion. As shown in FIG. 6, in the new distant view portion, models of the two buildings better conform to the intuitive feeling of human eyes, images are more realistic, and a three-dimensional sense of the image is enhanced. In addition, a quantity of pixels in a zoom-out virtual model is reduced, so that consumption of display resources of the game terminal is reduced, thereby lowering requirements for display hardware of the game terminal.

During actual implementation, an initial distant view image in the picture is replaced with the new distant view portion through an image control assembly of the electronic device to perform processing on the distant view in the user interface.

The following further illustrates an exemplary structure in which the image processing apparatus provided in an example embodiment of the disclosure is implemented as software modules or code. In some embodiments, as shown in FIG. 2, software modules/code of an image processing apparatus 208 stored in a memory 240 may include: an information transmission module 2081 and an information processing module 2082.

The information transmission module 2081 is configured to display a user interface, and display, in the user interface, a picture obtained by observing a virtual environment from a virtual camera, the picture including distant view portions corresponding to a virtual area of the virtual environment, the virtual area outside a preset range associated with the virtual cameras.

The information processing module 2082 is configured to detect an editing operation performed on a virtual model in the virtual area; and update, in response to determining the edited virtual model meets a specified condition, the distant view portion based on the edited virtual portion.

For example, the editing operation may include at least one of adding, deleting, enlarging, shrinking, translating, rotating, and modifying.

In some embodiments, the information processing module 2082 is configured to calculate an impact value of the edited virtual model on the distant view portion; and determine the impact value meets the specified condition.

For example, the specified condition may be the impact value of the edited virtual model exceeding a preset threshold, or the impact value of the edited virtual model being one of the top n impact values inside the virtual area, n being an integer larger than 0.

In some embodiments, the information processing module 2082 is configured to: calculate the impact value based on the editing operation and a weight associated with the virtual model.

In an example, the weight associated with the virtual model may be positively correlated to a size of the virtual model. Additionally, the calculation of the impact value may further be based on historical editing operations performed on the virtual model, the historical editing operations are not reflected in the distant view portion.

In some embodiments, the information processing module 2082 is configured to: generate a low-poly model based on the edited virtual model; and include the low-poly model in the distant view portion.

In some embodiments, the information processing module 2082 is further configured to merge the low-poly models into a new distant view model; and display the new distant view model.

In some embodiments, the information processing module 2082 is further configured to: extract a collision model of the edited virtual model before generating the low-poly model; and determining collision data based on the collision model.

In some embodiments, the user interface further displays a damage control assembly; and the information processing module 2082 is further configured to control, through the damage control assembly, a virtual object to initiate interaction with different virtual item models in the distant view portion.

In some embodiments, the information processing module 2082 is configured to trigger the damage control assembly to control the virtual object to launch an attack against different virtual item models in the distant view portion by using a virtual prop to display a scene in the user interface in which the virtual object attacks the virtual item model; and the information processing module 2082 is further configured to trigger the damage control assembly to control the virtual object to defend attacks from different virtual item models in the distant view portion by using the virtual prop to display a scene in the user interface in which the virtual object defends attacks from the virtual item models.

In some embodiments, the information processing module 2082 is further configured to: obtain a prop category of the virtual prop in a case that the virtual object launches the attack against different virtual item models in the distant view portion by using the virtual prop; and present a setting option corresponding to the prop category in the user interface, where the setting option is used for setting different attack manners of the virtual prop.

In some embodiments, the information processing module 2082 is further configured to: obtain a feature parameter of the virtual object in the game scene in a case that the distant-view editing operation is not triggered, and determine a payment manner matching the game scene directly based on the feature parameter of the virtual object, or determine a payment manner matching the game scene with reference to the feature parameter of the virtual object and type information of the virtual item model; and trigger a corresponding payment process based on the payment manner matching the game scene.

In some embodiments, the information processing module 2082 is further configured to: obtain a payment result corresponding to the payment process; determine a level parameter of the virtual object based on the payment result corresponding to the payment process; and determine a virtual item model matching the virtual object according to the level parameter of the virtual object.

According to the server shown in FIG. 2, an embodiment of the disclosure further provides a computer program product or a computer program. The computer program product or the computer program includes computer instructions, the computer instructions being stored in a non-volatile computer-readable storage medium. A processor of a computer device reads the computer instructions from the non-volatile computer-readable storage medium, and executes the computer instructions to cause the computer device to perform the virtual object control method provided in example embodiments in the image processing method.

Figure 7:
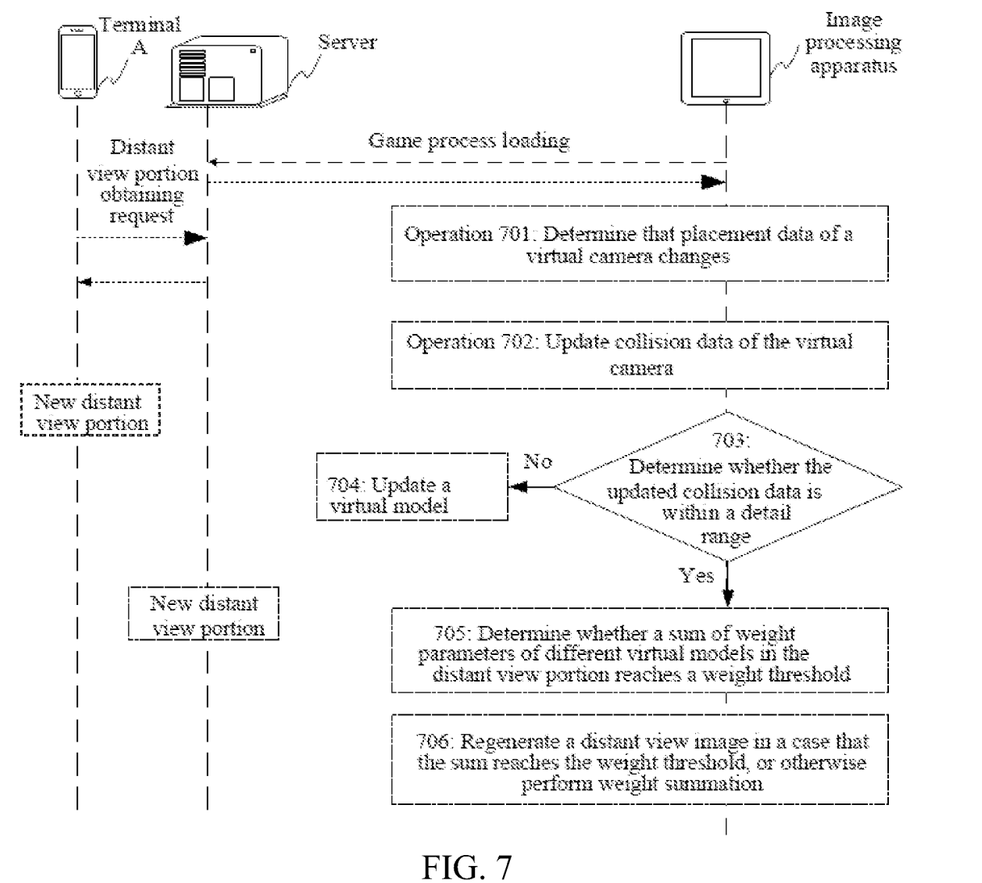
FIG. 7 is a schematic flowchart of an image processing method according to an embodiment.

FIG. 7 is an schematic flowchart of an image processing method according to an example embodiment of the disclosure. It may be understood that operations shown in FIG. 7 may be performed by various electronic devices running the image processing apparatus, for example, various game devices including the image processing apparatuses, where a dedicated terminal including the image processing apparatus may be encapsulated in the terminal 10-1 shown in FIG. 1 to execute corresponding code in the image processing apparatus shown in FIG. 2. The following describes the operations shown in FIG. 7.

Operation 701: An electronic device determines that placement data of a virtual model changes.

Operation 702: Update collision data of a virtual object.

In a case that the placement data of the virtual model changes, collision data matching the placement data is updated so that adjustment performed on a distant view portion may be triggered in time according to a change state of the virtual camera, and the game process is prevented from being interrupted caused by delay of the adjustment performed on the distant view portion.

Operation 703: Determine whether the updated collision data is within a detail range, if yes, perform operation 705; and if no, perform operation 704.

In a case that the collision data is out of the corresponding detail range, weight parameters corresponding to different virtual models in the distant view portion are determined, and the weight parameters of different virtual models in the distant view portions are summed.

Operation 704: Update the virtual model.

Operation 705: Determine whether a sum of weight parameters of different virtual models in the distant view portion reaches a weight threshold.

In a case that the sum of the weight parameters of different virtual models is higher than a corresponding weight threshold, virtual models matching a distant view portion in a current user interface are sequentially generated according to the weight parameters of different virtual models in the distant view portion, and the new distant view portion is determined based on the generated virtual models.

Operation 706: Regenerate a distant view portion in a case that the sum reaches the weight threshold, or otherwise perform weight summation.

Figure 8:
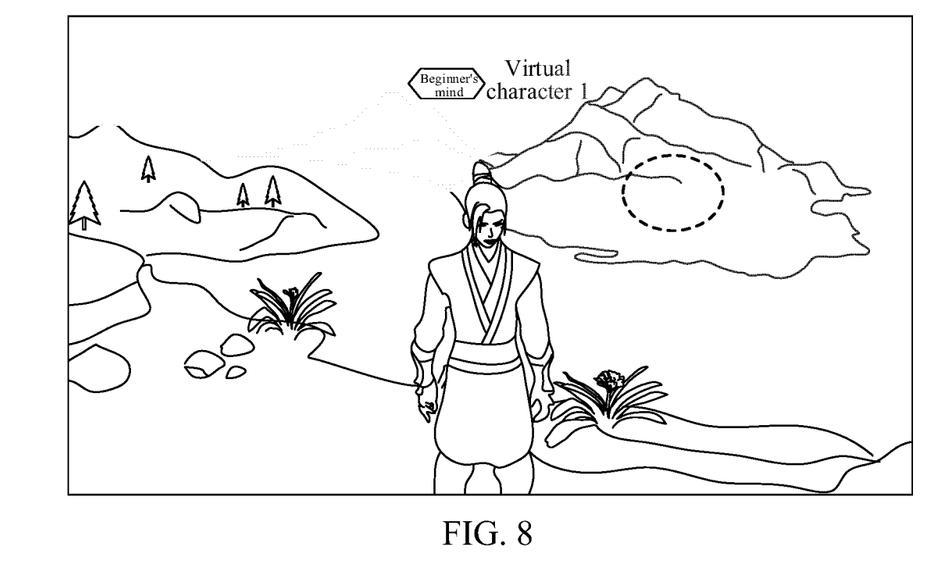
FIG. 8 is a schematic diagram of front-end display of an image processing method according to an embodiment.

FIG. 8 is a schematic diagram of front-end display of an image processing method according to an embodiment of the disclosure. In the game process, with the movement of the virtual object, when a close-up view image shown in FIG. 6 is adjusted to a distant view image shown in FIG. 8, different virtual models (two buildings shown in the figure) in the distant view portion have different weight parameters, and virtual models matching a distant view portion in a current user interface are sequentially generated according to the weight parameters of different virtual models in the distant view portion to determine a new distant view portion. As shown in FIG. 8, in the new distant view portion, models of the two buildings better conform to the intuitive feeling of human eyes in a current virtual environment, and a three-dimensional sense of the portion is enhanced, thereby preventing an unsuitable distant view portion from affecting user's observation of the user interface during the game process. In addition, a quantity of pixels in a zoom-out virtual model is reduced, so that system consumption required for display of the game terminal is reduced, thereby lowering requirements for the game terminal again.

After the distant view portion in the user interface is adjusted, in some embodiments, the user interface may further display a damage control assembly; and the virtual object is controlled through the damage control assembly to initiate interaction with different virtual models in the distant view portion.

In some embodiments, the controlling, through the damage control assembly, the virtual object to initiate interaction with different virtual item models in the distant view portion includes:

triggering the damage control assembly to control the virtual object to launch an attack against different virtual item models in the distant view portion by using a virtual prop to display a scene in the user interface in which the virtual object attacks the virtual item model; or triggering the damage control assembly to control the virtual object to defend attacks from different virtual item models in the distant view portion by using the virtual prop, to display a scene in the user interface in which the virtual object defends attacks from the virtual item models.

In some embodiments, the virtual object may alternatively be a digitalized object operable by a computer device, for example, a virtual character in the game scene. A controlled virtual object is a virtual object operable by a current terminal user. A virtual interactive scene is a scene provided for the virtual object to perform interaction, which may be a two-dimensional interactive scene, or may be a three-dimensional interactive scene. For example, in a game, the virtual interactive scene is an environment provided for opposing parties to adversarially interact with each other. An interactive instruction is used for controlling the controlled virtual object to perform corresponding actions. The interactive instruction may be generated by receiving a click operation performed on a keyboard or mouse or by detecting a sliding or tapping operation performed on a touchscreen, and the instruction may be adjusted according to different game environments. Certainly, for a same game process, a suitable interactive instruction generation manner (where the interactive instruction is transmitted through a control assembly of the touchscreen or through an external device of the terminal) may be selected according to user habits. The interactive instruction is an interactive operation initiated by the user through an input apparatus and is used for controlling the controlled virtual object to perform corresponding actions. The input apparatus may be a touch layer covering a display, or may be a button, a trackball, or a touch panel disposed on a housing of the computer device, or may be an external keyboard, a touch panel, or a mouse. That is to say, the initiation of the interactive instruction may be an operation initiated by the user through the keyboard, or an interactive operation triggered by the tapping operation performed on the touchscreen, or may be an interactive operation triggered in another manner, and the operation of the interactive instruction is not limited herein. An interactive action is an action corresponding to a skill identifier and performed by controlling the controlled virtual object. The skill identifier is used for uniquely identifying one skill, and each skill corresponds to an execution action.

In some embodiments, the interactive instruction may also be generated by detecting a user's gesture. For example, in a three-dimensional interactive scene, the interactive instruction may be generated according to the gesture performed by the user. The skill identifier is used for uniquely identifying one skill. Generally, there are many skills can be used in the game scene, including an attack skill and an evasion skill, and each skill may correspond to one skill identifier. The interactive instruction is an interactive operation initiated by the user, which is used for controlling the controlled virtual object to perform corresponding interactive actions. The interaction includes attack, evasion, and the like. The attack interaction may further be divided into short-distance attack and long-distance attack.

In some embodiments, a prop category of the virtual prop is obtained in a case that the virtual object launches the attack against different virtual item models in the distant view portion by using the virtual prop; and a setting option corresponding to the prop category is presented in the user interface, where the setting option is used for setting different attack manners of the virtual prop. An interactive attribute value of the virtual item model may be deducted in a case that the virtual prop hits a virtual item model. The interactive attribute value is used for representing an attribute state of the virtual item model during the interaction, For example, in a survival game, the interactive attribute value may be a virtual hit point, a virtual health point, a virtual energy point, and a virtual number of gold coins of the virtual item model.

Figure 9:
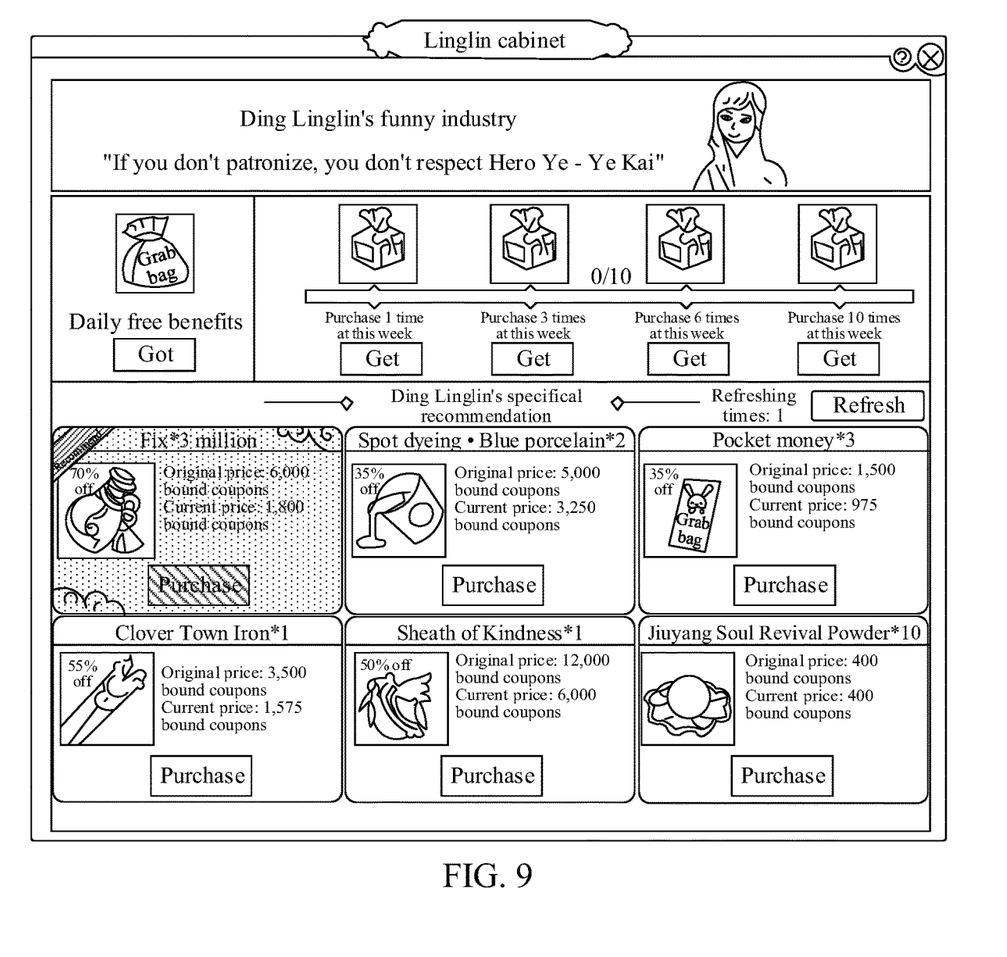
FIG. 9 is a schematic diagram of front-end display of a virtual item presentation method according to an embodiment.

In some embodiments, in a case that the distant-view editing operation is not triggered, a payment manner matching the game scene may be determined directly based on the feature parameter of the virtual object in the game scene, or a payment manner matching the game scene may be determined based on the feature parameter of the virtual object and type information of the virtual item model. Referring to FIG. 9, FIG. 9 is a schematic diagram of front-end display of a virtual item presentation method according to an embodiment of the disclosure. By triggering a corresponding payment process, the user in the game scene may determine, according to virtual item models presented in a current distant view image, which virtual item models are currently lacked, and then complete the payment process (for example, purchasing in a mini program in WeChat), so that more choices are provided for the user, thereby improving the user experience. For example, the game user may usually purchase a virtual item model of interest (for example, a game prop) in the virtual environment. The prop may generally refer to any movable items (which are weapons or transportation tools held by a game character) for decoration and arrangement in the scene. The prop is also included in the game. The game prop is an item that provides convenience to a game target user. The game prop is usually obtained by the game target user through tasks or purchased by the game target user. For example, as shown in FIG. 9, a sequence of virtual props purchased by the virtual character may be silver coins—basic resources, silver coins—basic resources, golden stone exchange vouchers—stone system, and general citta-dharma remnants (purple)—citta-dharma systematic props, or may be silver coins, silver coins, golden stone exchange vouchers, general citta-dharma remnants (purple). Such virtual item models suitable for different virtual characters all can be presented in the distant view image of the game scene. In some embodiments, a level parameter of the virtual object may further be determined based on the payment result corresponding to the payment process; and a virtual item model matching the virtual object may be determined according to the level parameter of the virtual object. For a virtual object with a higher level, virtual item models possessed by the virtual object in the distant view image in the game scene may have a greater quantity and more diversified types.

In the present disclosure, a user interface is displayed, and a picture obtained by observing a virtual environment from a virtual camera is displayed in the user interface, where the picture includes a distant view portion corresponding to a virtual area of the virtual environment and the virtual area is outside a preset range associated with the virtual camera; an editing operation performed in the virtual area is detected; and in response to determining the edited virtual model meets a specified condition, the distant view portion is updated based on the edited virtual model. Therefore, the distant view portion in the user interface can be flexibly adjusted, so that performance of the virtual scene is improved and the rendering effect of the distant view portion is improved while performance overhead consumed by running the terminal by the game is reduced, thereby bring a better distant view image use experience to the user.

The foregoing descriptions are merely embodiments of the disclosure, but are not intended to limit the disclosure. Any modification, equivalent replacement, and improvement made within the spirit and principle of the disclosure shall fall within the protection scope of the disclosure.

What is claimed is:

1. An image processing method, performed by a computer device, the method comprising:
    displaying, in a user interface, a picture obtained by observing a virtual environment from a virtual camera, the picture comprising a distant view portion corresponding to a virtual area of the virtual environment, the virtual area being outside a preset range associated with the virtual camera;
    detecting an editing operation performed on a virtual model in the virtual area; and
    updating, in response to determining the edited virtual model meets a specified condition, the distant view portion based on the edited virtual model,
    wherein determining the edited virtual model meets the specific condition comprises:
        calculating an impact value of the edited virtual model on the distant view portion; and
        determining the impact value meets the specified condition.

2. The image processing method according to claim 1, wherein the calculating an impact value of the edited virtual model on the distant view portion comprises:
    calculating the impact value based on the editing operation and a weight associated with the virtual model.

3. The image processing method according to claim 2, wherein the weight associated with the virtual model is positively correlated to a size of the virtual model.

4. The image processing method according to claim 3, wherein the weight associated with the virtual model and the size of the virtual model are correlated such that as size increases the weight increases.

5. The image processing method according to claim 2, wherein calculating the impact value is further based on historical editing operations performed on the virtual model, the historical editing operations are not reflected in the distant view portion.

6. The image processing method according to claim 4, wherein the specified condition is the impact value of the edited virtual model exceeding a preset threshold.

7. The image processing method according to claim 4, wherein the specified condition is the impact value of the edited virtual model is one of the a top n inside the virtual area, n being an integer larger than 0.

8. The image processing method according to claim 1, wherein the updating the distant view portion based on the edited virtual model comprises:
    generating a low-poly model based on the edited virtual model;
    including the low-poly model in the distant view portion.

9. The image processing method according to claim 8, wherein the including the low-poly model in the distant view portion comprises:
    merging the low-poly model into a distant view model; and
    displaying the distant view model.

10. The image processing method according to claim 8 further comprises:
    extracting a collision model of the edited virtual model before generating the low-poly model; and
    determining collision data based on the collision model.

11. The image processing method according to claim 1, wherein the editing operation comprises at least one of adding, deleting, enlarging, shrinking, translating, rotating, and modifying.

12. An image processing apparatus, comprising:
    at least one memory configured to store program code; and
    at least one processor configured to read the program code and operate as instructed by the program code, the program code comprising:
    an information transmission code configured to cause the at least one processor to display, in a user interface, a picture obtained by observing a virtual environment from a virtual camera, the picture comprising a distant view portion corresponding to a virtual area of the virtual environment, the virtual area being outside a preset range associated with the virtual camera; and
    an information processing code configured to cause the at least one processor to detect an editing operation performed on a virtual model in the virtual area; and
    update code configured to cause the at least one processor to update, in response to determining the edited virtual model meets a specified condition, the distant view portion based on the edited virtual model,
    wherein determining the edited virtual model meets the specified condition comprises:
        calculating an impact value of the edited virtual model on the distant view portion; and
        determining the impact value meets the specified condition.

13. The image processing apparatus according to claim 12, wherein the calculating an impact value of the edited virtual model on the distant view portion comprises:
    calculating the impact value based on the editing operation and a weight associated with the virtual model.

14. The image processing apparatus according to claim 13, wherein the weight associated with the virtual model is correlated to a size of the virtual model.

15. The image processing apparatus according to claim 14, wherein the weight associated with the virtual model and the size of the virtual model are correlated such that as the size increases the weight increases.

16. The image processing apparatus according to claim 13, wherein calculating the impact value is further based on historical editing operations performed on the virtual model, the historical editing operations are not reflected in the distant view portion.

17. The image processing apparatus according to claim 12, wherein the specified condition is the impact value of the edited virtual model exceeding a preset threshold.

18. The image processing apparatus according to claim 12, wherein the specified condition is the impact value of the edited virtual model is one of the a top n inside the virtual area, n being an integer larger than 0.

19. The image processing apparatus according to claim 12, wherein the updating the distant view portion based on the edited virtual model comprises:
    generating a low-poly model based on the edited virtual model;
    including the low-poly model in the distant view portion.

20. A non-volatile-transitory_computer-readable storage medium, storing a program code that when executed by at least one processor causes the at least one processor to:
    display, in a user interface, a picture obtained by observing a virtual environment from a virtual camera, the picture comprising a distant view portion corresponding to a virtual area of the virtual environment, the virtual area being outside a preset range associated with the virtual camera;
    detect an editing operation performed on a virtual model in the virtual area; and
    update, in response to determining the edited virtual model meets a specified condition, the distant view portion based on the edited virtual model,
    wherein determining the edited virtual model meets the specified condition comprises:
        calculating an impact value of the edited virtual model on the distant view portion; and
        determining the impact value meets the specified condition.

* * * * *